Dec. 26, 1961 L. T. BOWERS 3,015,022
ARC SPOT WELDING APPARATUS AND METHOD
Filed Sept. 23, 1960
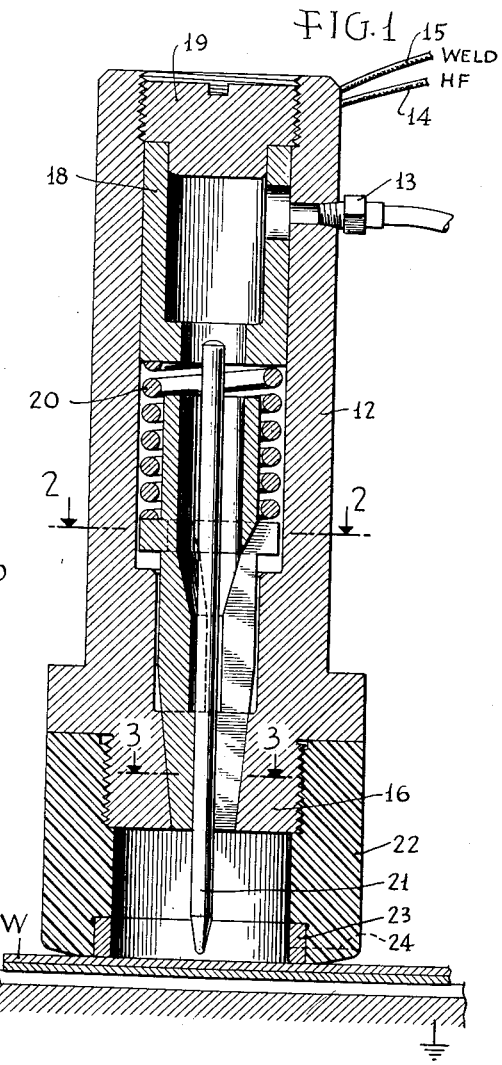
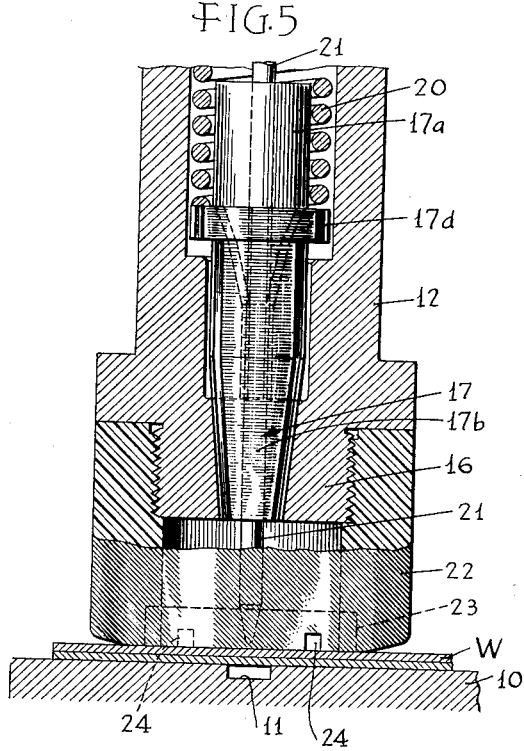
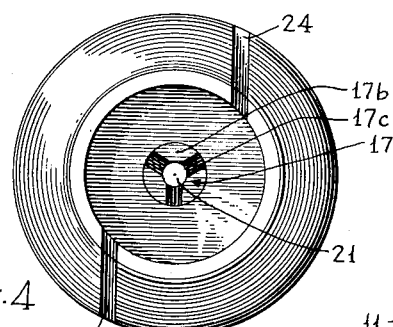
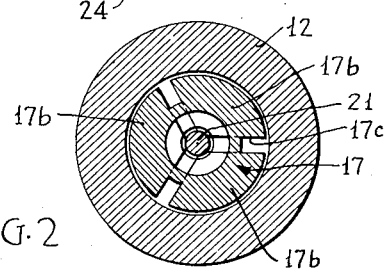
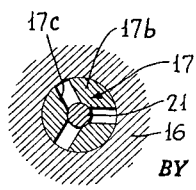
INVENTOR.
Lester T. Bowers
BY
Wm. R. Glisson
ATTORNEY United States Patent Office 3,015,022
Patented Dec. 26, 1961

3,015,022
ARC SPOT WELDING APPARATUS AND METHOD
Lester T. Bowers, Oreland, Pa., assignor to The Budd Company, Philadelphia, Pa., a corporation of Pennsylvania
Filed Sept. 23, 1960, Ser. No. 57,922
6 Claims. (Cl. 219—127)

This invention relates to arc welding apparatus and method, with special application to arc spot welding, and has for an object the provision of improvements in this art.

The type of welding concerned is often referred to as TIG welding, meaning tungsten electrode with inert gas protection. The utility of the invention is not limited to tungsten electrodes; it can be applied to consumable electrodes; but it contemplates starting an arc without contacting the electrode with the work and withdrawing it to strike the arc.

One of the particular purposes of the invention is to start the arc of welding current and to concentrate and localize it at the start, whereby the arc and heat will be sharply concentrated in one spot from the very beginning of a weld. This is extremely useful for arc spot welding very thin sheet material in very small weld zones without melting through it ("burn-through"). Material so thin as to be subject to being welded by five cycles or less of sixty cycle current has been successfully welded by the present method and apparatus; whereas it is almost impossible to consistently and dependably arc spot weld it otherwise.

The invention contemplates the use of a welding unit in which a hood or nozzle surrounds the electrode with means to supply a protective gas (argon etc., as known) around the electrode within the hood; and the invention provides means for promoting a corona discharge of high frequency current from the electrode to cause ionization of the gas and thereby to cause immediate initiation of the welding current arc in the shortest possible path and the maintenance of the arc in an exact spot during the weld period. Specifically means are provided for creating a uniform band or zone of ionized gas around the tip of the electrode.

The method includes the supply of protective (commonly inert) gas and high frequency starting current as the welding head approaches and before it reaches the workpiece so that when the unit is seated and the welding current is supplied the hood will be thoroughly filled with gas which has been ionized at the tip of the electrode ready for starting to strike the welding arc. It has been found that the corona discharge and/or reactance effect and ionization of the gas can be initiated before the electrode reaches its close proximity to the workpiece for welding by providing a metal body adjacent or around the electrode tip to attract the high frequency current from other leakage paths to thus ionize the surrounding gas.

In the preferred form of the invention the insulating cylindrical hood or nozzle is provided with an annular isolated insulated metal member, preferably a complete band, at or near its outer end which concentrically surrounds the tip of the electrode. The band will be effective for starting if it stops short of the end of the hood or nozzle; but when it extends to the end it seats on the workpiece and aids in reducing wear on the end of the non-metallic hood.

The invention will be described in connection with an exemplary embodiment, reference being made to the accompanying drawings wherein:

FIG. 1 is a vertical section through an arc spot welding unit embodying the invention;

FIG. 2 is a horizontal section taken on the line 2—2 of FIG. 1;

FIG. 3 is a partial horizontal section taken on the line 3—3 of FIG. 1;

FIG. 4 is a bottom plan view looking upward; and

FIG. 5 is a partial vertical section similar to FIG. 1 but showing the parts at an angularly shifted section.

It will be understood that a hand manipulated tool is used but no attempt has been made to show a complete tool with all handles, switches, valves and other appurtenances; instead a simplified assembly has been shown for illustrative purposes.

The workpiece W, here indicated to be two thin sheets to be welded together, is carried on a metal support table 10 which is connected in circuit, shown as being grounded. For some metals a groove 11 is provided in the table so an inert gas may be fed under the workpiece to protect the back from oxidizing when heated.

The welding unit comprises a holder 12 provided with a conduit connection 13 for supplying a protective gas (argon, etc., as known) to its interior space; also a conductor 14 for supplying high frequency starting current and a conductor 15 for supplying welding current (200–300 amperes) at relatively low voltage (80 v. or more) and normally 30 c.p.s. A.C.

The lower portion 16 of the holder 12 is tapered interiorly to provide a chuck holder for a chuck 17. The chuck has a tubular top portion 17a, divided gripping segments 17b tapered on the outer side, with slots 17c between them, and a circumferential flange 17d. A hollow member 18, with an opening at its lower end and a side opening at the gas supply connection, is fitted within the tubular interior of the holder and is retained by a plug 19 threaded into the upper end of the holder. A spring 20 between the flange 17d and the member 18 forces the chuck down to grip an electrode.

The chuck holds an electrode 21. By pushing the chuck up from the bottom the electrode can be released. It can then be moved to any adjusted position and clamped by releasing the chuck. An electrode can also be replaced if desired.

A hood or nozzle 22 is secured around the lower end of the electrode. It is shown as being threaded on the lower portion 16 of the holder. The hood is made of insulating material which may be a plastic or a ceramic. "Nylon" is one plastic which has been used successfully. A ceramic which has given good results is one known as "Surbraze M–120."

According to the present invention means are provided for inducing a displacement current flow and a corona discharge of high frequency (5 or more megacycles at voltage of 110 v. or more) current from the electrode to ionize the gas within the hood to initiate the welding arc. The means herein shown for this purpose comprises an isolated insulated metal member, preferably a complete annular metal band or ring 23 (as of stainless steel) concentrically surrounding the tip end of the electrode, the band here being secured within the hood 22 at its lower end in a position to engage the workpiece. An incomplete ring or even a metal body near the electrode will attract the high frequency current but a ring has been found to give best results.

Both the hood 22 and the band 23 are provided with end grooves 24 for the restricted outflow of protective gas along and over the surface of the workpiece. The grooves are staggered relative to a diameter between them and are tangentially disposed relative to an imaginary inner circle drawn concentrically around the electrode axis so as to induce a whirling mixing action of the gas within the hood and provide adequate escape of gas upon expansion. The groove arrangement per se is known from Patent No. 2,721,923 but it is believed to have added advantages with the teaser band around the tip and the ionized or plasma zone of metal created around the electrode tip as provided herein.

In use, the protective gas and also high frequency starting current will be supplied before the welding current is supplied. This welding current is applied after the gun has been seated on a workpiece. The conditioning for initiating the weld arc is initiated and has been found to be completed even before the welder reaches the workpiece, the action being good before the welder is seated for making a weld. However, the welding current will be started only after the gun is properly positioned. The controls for timing the weld current are well known and need not be illustrated or described. The gas flow and high frequency current are maintained throughout the welding current period and the gas supply is maintained and the welder kept in position until the weld zone has cooled to the point where it no longer needs protection.

The effect of the band 23 is not completely understood but the improvement in initiating, concentrating and maintaining the welding arc is very outstanding. It is assumed that it induces a displacement flow and corona discharge from the electrode and that this ionizes the gas so as to make sparking easy; and that its concentric position around the electrode produces a uniform corona discharge at the tip to cause the spark to follow the most direct and shortest path to the workpiece and avoid spraying which is so usual with other tungsten inert gas arc spot welding equipment.

The gas flow is relatively slow to avoid too rapid discharge of ionized gas but is sufficiently rapid to fully protect the weld zone and prevent the entry of air. For low carbon steel a minimum flow of argon of about 6 cu. ft. per hour was found to produce good welds in material up to 0.060" thick. Arc lengths of 0.005" to 0.060" with a 3/32" diameter thoriated tungsten tapered to 0.020" face diameter within a hood of 5/8" to 3/4" I.D. produced good results on 0.0025" sheet.

As an example of the benefits of this starting teaser or focusing ring, it may be noted that without the ring the maximum electrode life for touch starting is limited to approximately 100 welds. Non-touch starting with high frequency current but without the teaser ring is so inconsistent and unreliable, that so far as known, it is not used. With the teaser or focusing ring, 10,000 welds in argon gas shielding and 5,000 welds in helium gas were made before there was any noticeable wear (less than .004") at the tungsten electrode tip.

While one embodiment of the invention has been described for purposes of illustration it is to be understood that the invention can have various embodiments and modifications within the limits of the invention.

What is claimed is:
1. Arc welding apparatus comprising in combination, an electrode holder provided with means for supplying high frequency starting current before and during welding and for supplying welding current after the holder is seated on a work-piece to be welded, together with means for supplying an inert protective gas around the electrode before and during welding, a hood nozzle of insulating material surrounding the electrode and having its tip end disposed a short distance beyond the tip end of the electrode, and an isolated insulated metal teaser body carried by the hood nozzle opposite the electrode tip for drawing a displacement flow of high frequency current from the electrode and creating a zone of ionized gas around the tip of the electrode before and when the hood nozzle is seated on the workpiece for initiating, stabilizing, and focusing the arc of welding current when it is applied after the hood nozzle is applied to the workpiece.

2. Apparatus as set forth in claim 1, wherein said metal teaser body comprises a complete metal band secured within and at the end of said hood nozzle and concentrically around the tip end of the electrode.

3. Apparatus as set forth in claim 2, wherein said metal teaser body band extends to the end of the hood nozzle and is provided, along with the nozzle, with end grooves for the outflow of protecting gas.

4. The method of making arc spot welds by a welding unit having an insulated hood nozzle with a metal teaser body at its end, an insulated electrode having its tip end disposed coaxially with the metal teaser body, together with means for supplying inert protective gas around the electrode tip within the hood nozzle, means to supply high frequency starting current and means for supplying welding current, which method comprises, supplying high frequency starting current and inert protective gas to the hood nozzle to create a zone of ionized gas around the electrode tip before the hood nozzle is seated on the workpiece and thereafter bring the hood nozzle to the workpiece and supplying welding current.

5. The method as set forth in claim 4, which further comprises maintaining the high frequency current throughout the time the weld is being made.

6. The method as set forth in claim 5, wherein the gas flow through the hood nozzle is maintained at a minimum of about 6 cu. ft. per hour for purging before welding, during welding, and after welding, until the weld is safely cool.

References Cited in the file of this patent

UNITED STATES PATENTS

| | | |
|---|---|---|
| 1,980,447 | Stine | Nov. 15, 1924 |
| 2,721,923 | Anderson | Oct. 25, 1955 |
| 2,829,238 | Hackman | Apr. 1, 1958 |